(12) United States Patent
Kuo

(10) Patent No.: US 7,831,139 B2
(45) Date of Patent: Nov. 9, 2010

(54) CAMERA MODULE WITH LENS CARRYING STRUCTURE USING ELECTROSTATIC DRIVING UNIT

(75) Inventor: Pei-Ching Kuo, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 262 days.

(21) Appl. No.: 12/118,964

(22) Filed: May 12, 2008

(65) Prior Publication Data

US 2009/0190919 A1 Jul. 30, 2009

(30) Foreign Application Priority Data

Jan. 28, 2008 (CN) .................. 2008 1 0300240

(51) Int. Cl.
*G03B 3/10* (2006.01)
*G03B 13/34* (2006.01)
*H02N 1/00* (2006.01)

(52) U.S. Cl. .................. 396/133; 396/529; 348/357; 359/823; 310/309

(58) Field of Classification Search .................. None
See application file for complete search history.

(56) References Cited

U.S. PATENT DOCUMENTS

| | | | | |
|---|---|---|---|---|
| 6,531,804 B2* | 3/2003 | Kasahara | .................. | 310/309 |
| 6,611,079 B2* | 8/2003 | Koga et al. | .................. | 310/309 |
| 6,865,009 B2* | 3/2005 | Nishioka | .................. | 359/295 |
| 6,900,576 B2* | 5/2005 | Koga et al. | .................. | 310/309 |
| 7,447,330 B2* | 11/2008 | Yamasaki | .................. | 382/100 |
| 7,583,006 B2* | 9/2009 | Calvet et al. | .................. | 310/309 |
| 2002/0036443 A1* | 3/2002 | Akiba et al. | .................. | 310/309 |
| 2002/0106204 A1* | 8/2002 | Miyamaru | .................. | 396/89 |
| 2005/0195502 A1 | 9/2005 | Jeong et al. | | |
| 2006/0066174 A1* | 3/2006 | Akiba et al. | .................. | 310/309 |
| 2006/0209427 A1* | 9/2006 | Akiba et al. | .................. | 359/694 |
| 2007/0139528 A1* | 6/2007 | Chang | .................. | 348/208.11 |
| 2007/0217786 A1* | 9/2007 | Cho et al. | .................. | 396/542 |
| 2007/0284964 A1* | 12/2007 | Chung et al. | .................. | 310/309 |
| 2008/0144186 A1* | 6/2008 | Feng et al. | .................. | 359/666 |

FOREIGN PATENT DOCUMENTS

| | | |
|---|---|---|
| CN | 1509061 A | 6/2004 |
| CN | 101056073 A | 10/2007 |
| CN | 101056360 A | 10/2007 |
| JP | 2003289679 A | 10/2003 |

* cited by examiner

*Primary Examiner*—W. B. Perkey
*Assistant Examiner*—Bret Adams
(74) *Attorney, Agent, or Firm*—Andrew C. Cheng

(57) ABSTRACT

A camera module includes a barrel for receiving at least a first lens, an actuator, and a holder. The actuator includes an annular stator and a carrying member. The stator is connected to the barrel and defines a plurality of spaced parallel inner branches in an inner side thereof. The carrying member is received in the stator and defines a through hole therein for receiving at least a second lens. The carry member defines a plurality of spaced parallel outer branches in the outer sidewall thereof. The outer branches are alternately interleaved between the inner branches and have a voltage thereacross for driving the carrying member to move forward and backward. The holder is connected to the barrel and configured for receiving the barrel and the actuator.

15 Claims, 2 Drawing Sheets

CAMERA MODULE WITH LENS CARRYING STRUCTURE USING ELECTROSTATIC DRIVING UNIT

RELATED FIELD

The present invention relates to a camera module, and, in particular, to a compact camera module which enables auto-focus and zoom by providing a lens carrying structure using an electrostatic driving unit.

BACKGROUND

Modern cameras now have a host of functions that can be automatically performed allowing users with little knowledge of photography to take quality pictures. Now with the introduction of camera modules to everyday electronic devices such as mobile phones, personal digital assistants and the like, there is a desire to have these same automatic functions included therein. However, due to the demand for ever-smaller products containing the camera modules, it is difficult to offer as many functions as the modern cameras. A camera module having a compact driving unit for decreasing the size of the camera module to allow inclusion of optical zoom and auto-focusing functions is therefore needed.

SUMMARY

A camera module includes a barrel for receiving at least a first lens, an actuator, and a holder. The actuator includes an annular stator and a carrying member. The stator is connected to the barrel and defines a plurality of spaced parallel inner branches in an inner side thereof. The carrying member is received in the stator and defines a through hole therein for receiving at least a second lens. The carry member defines a plurality of spaced parallel outer branches in the outer sidewall thereof. The outer branches are alternately interleaved between the inner branches and have a voltage thereacross for driving the carrying member to move forward and backward. The holder is connected to the barrel and configured for receiving the barrel and the actuator.

Other novel features and advantages will become more apparent from the following detailed description when taken in conjunction with the accompanying drawings.

BRIEF DESCRIPTION OF THE DRAWINGS

The present invention is described in detail hereinafter, by way of example and description of preferred and exemplary embodiments thereof and with reference to the accompanying drawings, in which.

DETAILED DESCRIPTION OF EXEMPLARY EMBODIMENTS

A detailed explanation of a camera module according to an exemplary embodiment of the present invention will now be made with reference to the drawings attached hereto.

Figure 1:
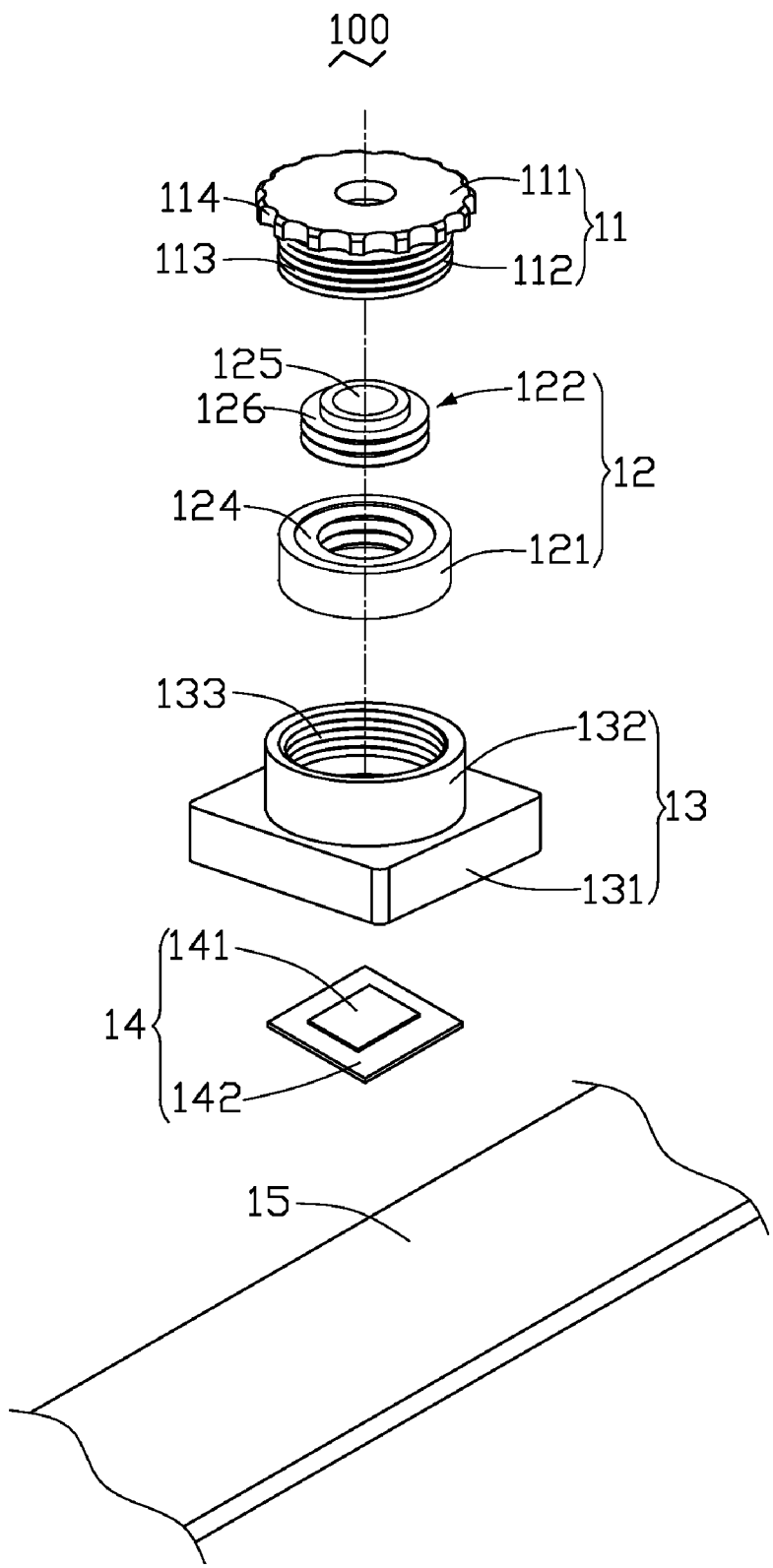
FIG. 1 is an isometric, exploded view of a camera module according to an exemplary embodiment.
Figure 2:
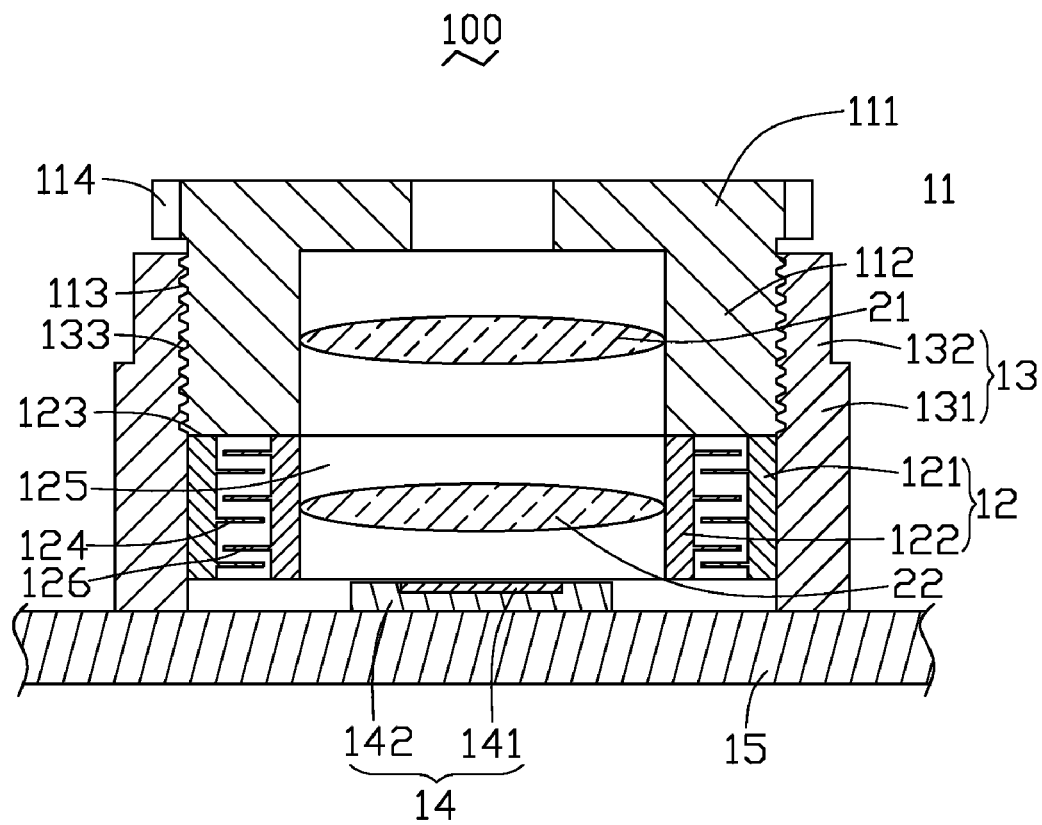
FIG. 2 is a cross-sectional view of an assembly of the camera module of FIG. 1 along the line O-O'.

Referring to FIGS. 1-2, a camera module 100 according to the exemplary embodiment is shown. The camera module 100 includes a barrel 11 for receiving at least a first lens 21, an actuator 12 connected to the barrel 11, a holder 13 for receiving the barrel 11 and the actuator 12, an image sensor module 14, and a printed circuit board (PCB) 15.

The barrel 11 is a hollow cylinder and defines a first annular portion 111 and a second annular portion 112. The second annular portion 112 defines an outer screw thread 113. The second annular portion 112 is hollow or tubular in order to receive the first lens 21 therein. In the present embodiment, one first lens 21 is received in the barrel 11 only as an example. The first lens 21 can be a fluid lens and includes two kinds of liquids having different refractive indexes. One of the liquids is a conductive solution and the other is a non-conductive solution. The conductive solution is electronically connected to the PCB 15 and its refractive index can be changed according to a voltage applied thereto thus providing adjustable characteristics of the first lens 21. The first annular portion 111 defines a number of teeth 114 regularly spaced about the periphery of the second annular portion 112.

The actuator 12 is spaced from the PCB 15, and includes an annular stator 121 and a carrying member 122 received in the annular stator 121. The stator 121 is fixed on the barrel 11 via an adhesive 123 and has a same optical axis O-O' as the barrel 11. A number of spaced parallel inner branches 124 are defined in an inner sidewall of the stator 121 and perpendicular to the inner sidewall. The carrying member 122 is held in position by electrostatic power, and defines a through hole 125 for receiving at least a second lens 22. In the present embodiment, only one second lens 22 is presented as an example to explain configurations and working principle of the carrying member 122. Understandably, the second lens 22 may also be a fluid lens. A number of spaced parallel outer branches 126 are defined in an outer sidewall of the carrying member 122. The inner branches 124 and the outer branches 126 are integrally formed with the stator 121 and the carrying member 122, respectively. In another embodiment, connecting methods, such as welding, and so on may be used to connect the branches 124, 126. The inner branches 124 are alternately interleaved between the spaced outer branches 126. The carrying member 122 and the stator 121 are made of silicon crystal, germanium crystal, or the like, using for example reactive ion etching. A controllable voltage with a phase difference, such as AC voltage, is supplied to the actuator 12 and an electrostatic power may be achieved between the inner branches 124 and the outer branches 126 for driving the carrying member 122 to move forward and backward.

The holder 13 includes a base portion 131 and an extension section 132. The base portion 131 includes four sidewalls cooperatively forming a rectangular chamber (not labeled) for receiving the image sensor module 14 therein. The extension section 132 has a columnar configuration, and extends perpendicularly from the middle of the base portion 131 and defines an inner screw thread 133 configured for engaging with the outer screw thread 113 of the barrel 11.

The image sensor module 14 includes an image sensor 141 and a base 142 configured for supporting the image sensor 141 and electrically connecting to the image sensor 141. The image sensor module 14 is configured for capturing images and converting the images into digital data to be processed by a processor. The image sensor module 14 is received in the rectangular chamber of the base portion 131.

The PCB 15 is electronically connected to the actuator 12 and the image sensor module 14 and configured for providing the controllable voltage and signals to the actuator 12 and the image sensor module 14.

In use, when the zoom function or the auto-focus function of the camera module 100 is activated, a CPU of an electronic device using the camera module 100 supplies a voltage to the actuator 12, and the carrying member 122 moves forward and backward under electrostatic power of the inner and outer branches 124, 126. Thus, the distance between the first lens 21 and the second lens 22 may be decreased or increased to adjust focus-length of the camera module. Understandably, when the captured image is in focus, the supplied voltage may be reserved and the actuator 12 doesn't move.

As described above, it is possible to make a similar and smaller camera module than the conventional one which only moves a lens unit by a lens barrel. In addition, the camera module of the present invention may transfer a driving force in a more direct and simpler way. Moreover, this camera module may perform the auto focus function and the zoom function utilizing the compact actuator 12, so it is possible to provide a compact lens module which may be inserted into a cellular phone.

It should be understood that the above-described embodiment is intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A camera module, comprising:
    a barrel for receiving at least a first lens;
    an actuator comprising:
        an annular stator connected to the barrel and defining a plurality of spaced parallel inner branches in an inner side thereof; and
        an annular carrying member being received in the annular stator and defining a through hole therein for receiving at least a second lens, and defining a plurality of spaced parallel outer branches in the outer sidewall thereof, the outer branches being alternately interleaved between the inner branches and having a voltage thereacross for driving the carrying member to move forward and backward;
        wherein each inner branch and outer branch is a continuous annular configuration; and
    a holder connected to the barrel and configured for receiving the barrel and the actuator.

2. The camera module as claimed in claim 1, wherein the barrel is connected to the holder via a screw thread.

3. The camera module as claimed in claim 1, wherein the voltage is an AC voltage.

4. The camera module as claimed in claim 1, wherein the first lens is a fluid lens.

5. The camera module as claimed in claim 4, wherein the first lens comprises a conducting solution and a non-conducting solution.

6. The camera module as claimed in claim 1, wherein the second lens is a fluid lens.

7. The camera module as claimed in claim 6, wherein the second lens comprises a non-conducting fluid and a conducting fluid.

8. The camera module as claimed in claim 1, further comprising a printed circuit board electronically connected to of the actuator and configured for providing power for the actuator.

9. The camera module as claimed in claim 8, wherein the printed circuit board provides a voltage with a phase difference applied to the actuator for driving the carrying member of the actuator to move forward or backward.

10. The camera module as claimed in claim 8, wherein the first lens is a liquid lens comprising a conducting fluid, and the printed circuit board is further electronically connected to the first lens for adjusting a refractive index of the conducting fluid.

11. The camera module as claimed in claim 1, wherein the stator and the carrying member are made of silicon crystal.

12. The camera module as claimed in claim 1, wherein the stator and the carrying member are made of germanium crystal.

13. The camera module as claimed in claim 1, wherein the stator and the carrying member are made by reactive ion etching.

14. The camera module as claimed in claim 1, further comprising an image sensor module received in a base portion of the holder.

15. The camera module as claimed in claim 1, further comprising an adhesive for connecting the barrel to the stator.

* * * * *